US010915684B2

(12) United States Patent
Feldman et al.

(10) Patent No.: US 10,915,684 B2
(45) Date of Patent: Feb. 9, 2021

(54) AUTOMATIC REDESIGN OF DIGITAL CIRCUITS

(71) Applicant: Palo Alto Research Center Incorporated, Palo Alto, CA (US)

(72) Inventors: Alexander Feldman, Santa Cruz, CA (US); Ion Matei, Sunnyvale, CA (US); Johan de Kleer, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 3 days.

(21) Appl. No.: 16/160,027

(22) Filed: Oct. 15, 2018

(65) Prior Publication Data
US 2020/0065436 A1 Feb. 27, 2020

Related U.S. Application Data

(60) Provisional application No. 62/721,676, filed on Aug. 23, 2018.

(51) Int. Cl.
| | |
|---|---|
| *G06F 9/455* | (2018.01) |
| *G06F 17/50* | (2006.01) |
| *G06F 30/327* | (2020.01) |
| *G06F 30/367* | (2020.01) |

(52) U.S. Cl.
CPC .......... *G06F 30/327* (2020.01); *G06F 30/367* (2020.01)

(58) Field of Classification Search
USPC .................. 716/102, 104, 106, 111, 112
See application file for complete search history.

(56) References Cited

U.S. PATENT DOCUMENTS

| | | | | | |
|---|---|---|---|---|---|
| 2,926,316 | A | * | 2/1960 | Rae-Fraser | H03D 3/08 333/177 |
| 5,673,028 | A | * | 9/1997 | Levy | G01D 7/005 116/209 |
| 6,978,437 | B1 | * | 12/2005 | Rittman | G03F 1/36 250/492.3 |
| 9,846,753 | B2 | * | 12/2017 | Lee | G06F 30/367 |
| 2001/0044912 | A1 | * | 11/2001 | Francis | G06F 11/0721 714/30 |
| 2002/0174409 | A1 | * | 11/2002 | Cohn | G06F 30/33 716/113 |
| 2003/0135798 | A1 | * | 7/2003 | Katayama | G11B 20/1833 714/710 |
| 2006/0282246 | A1 | * | 12/2006 | Graur | G06F 30/39 703/13 |

(Continued)

OTHER PUBLICATIONS

Noam Shazeer , Azalia Mirhoseini , Krzysztof Maziarz , Andy Davis , Quoc Le , Geoffrey Hinton and Jeff Dean, "Outrageously Large Neural Network: The Sparsely-Gated Mixture of Experts Layer," in the Proceedings of the 5th International Conference on Learning Representations, Apr. 24-26, 2017, Palais des Congrès Neptune, Toulon, France.

(Continued)

*Primary Examiner* — Brian Ngo
(74) *Attorney, Agent, or Firm* — Fay Sharpe LLP

(57) ABSTRACT

The following relates generally to design and redesign of digital circuits. In one disclosed embodiment, a circuit is annotated by identifying at least one possible error location according to an error library; the at least one possible error location is localized; and the circuit is redesigned based on the localized at least one possible error location.

20 Claims, 5 Drawing Sheets

(56) References Cited

U.S. PATENT DOCUMENTS

| | | | | |
|---|---|---|---|---|
| 2007/0044045 | A1* | 2/2007 | Zhuang | G06F 17/505 716/102 |
| 2007/0234161 | A1* | 10/2007 | Blanton | G01R 31/2846 714/736 |
| 2007/0264731 | A1* | 11/2007 | Jeng | G01R 31/31836 438/14 |
| 2013/0036394 | A1* | 2/2013 | Yang | G06F 17/5081 716/112 |
| 2016/0266973 | A1* | 9/2016 | Abe | G06F 11/1068 |
| 2019/0102338 | A1* | 4/2019 | Tang | G06F 15/82 |

OTHER PUBLICATIONS

Mu Li, Tong Zhang, Yuqiang Chen, and Alexander J. Smola. 2014. Efficient mini-batch training for stochastic optimization. In Proceedings of the 20th ACM SIGKDD international conference on Knowledge Discovery and data mining (KDD '14). ACM, New York, NY, USA, 661-670.

Kingma, D. P. & Ba, J. L (2015). Adam: a Method for Stochastic Optimization. International Conference on Learning Representations, 1-13.

Dozat, T. (2016). Incorporating Nesterov Momentum into Adam. ICLR Workshop, (1), 2013-2016.

Alan C. Hindmarsh, Peter N. Brown, Keith E. Grant, Steven L. Lee, Radu Serban, Dan E. Shumaker, and Carol S. Woodward. 2005. Sundials: Suite of nonlinear and differential/algebraic equation solvers. ACM Trans. Math. Softw. 31, (Sep. 3, 2005), 363-396.

Rall, Louis B. (1981). Automatic Differentiation: Techniques and Applications. Lecture Notes in Computer Science, Springer, ISBN 3-540-10861-0.

M. S. Arulampalam, S. Maskell, N. Gordon and T. Clapp, "A tutorial on particle filters for online nonlinear/non-Gaussian Bayesian tracking," in IEEE Transactions on Signal Processing, vol. 50, No. 2, pp. 174-188, Feb. 2002.

Tibshirani, Robert, "Regression Shrinkage and Selection via the lasso". Journal of the Royal Statistical Society. Series B (methodological). Wiley. 58 (1): 267-88, 1996.

Noura, H., Theilliol, D., Ponsart, J.-C., Chamseddine, A., "Fault-tolerant Control Systems: Design and Practical Applications," Springer, 2009, ISBN: 978-1-84882-652-6.

Ion Matei, Johan de Kleer and Raj Minhas, "Learning constitutive equations of physical components with constraints discovery", (Jun. 27-29, 2018).

* cited by examiner

AUTOMATIC REDESIGN OF DIGITAL CIRCUITS

INCORPORATION BY REFERENCE

The present application claims the benefit of priority of U.S. Provisional Application Ser. No. 62/721,676, filed Aug. 23, 2018, the entirety of which is incorporated herein by reference.

BACKGROUND

The present application relates generally to automatic design and redesign of digital circuits.

Design engineers use Electronic Design Automation (EDA) software to create digital Integrated Circuits (ICs). They typically use an iterative waterfall model: starting from requirements, they create initial design and functional tests. If the functional tests fail, the initial design is updated and sometimes new functional tests are added. The redesign/test process is repeated until all functional tests pass. The process of modifying the design such that it passes all functional tests is manual, costly, and error prone. A mistake in the design can lead to a huge expenditure, especially if a bug remains after the functional testing.

BRIEF DESCRIPTION

The systems and methods described herein combine a digital design and a minimal functional test suite as inputs to compute: (1) a report containing the quantity and location of all design errors (e.g. from various semiconductor designs from different vendors), and (2) a new, redesigned circuit, in which a significant portion of the design faults are eliminated. The systems and methods described herein offer a fully automatic software tool that is capable of scaling to exceptionally large designs (e.g., billions of logic gates/flip flops). This tool dramatically improves the time it takes designers to debug their designs. The tool is also easily usable by non-expert designers since it identifies and eliminates the majority of design errors automatically. Some embodiments described herein take advantage of two important properties: (1) that most bad designs are almost correct, and (2) the availability of functional tests. By reconceiving physical faults as equivalent to design faults, the same diagnosis algorithms for physical fault diagnosis and repair are extendable to design error isolation and redesign.

In accordance with one aspect of the present application, there is an apparatus for redesigning a circuit, including: at least one processor; and at least one memory including computer program code. The at least one memory and the computer program code may be configured to, with the at least one processor, cause the apparatus at least to: annotate the circuit by identifying at least one possible error location; localize the at least one possible error location; and redesign the circuit based on the localized at least one possible error location.

In the apparatus as described in the preceding paragraph, the at least one processor may be configured to execute the computer-readable instructions to cause the apparatus to perform the identifying of the at least one possible error location according to information from an error library. The at least one processor may be configured to execute the computer-readable instructions to cause the apparatus to perform the identifying of the at least one possible error location by determining that inputs to a component are connected to a bus in reverse order. The at least one processor may be configured to execute the computer-readable instructions to cause the apparatus to perform the annotation by considering a switch that changes an order of connection of inputs to a component of the circuit. The at least one processor may be configured to execute the computer-readable instructions to cause the apparatus to perform the annotation by using a logic block that replaces a first component, wherein the logic block includes alternative components, a multiplexer, and a demultiplexer. In one embodiment, the first component is an OR-gate; and the alternative components include an AND-gate, and a XOR-gate. The at least one processor may be configured to execute the computer-readable instructions to cause the apparatus to perform the annotation according to: a first state machine with state names of the first state machine; and a second state machine, wherein inputs to the second state machine are the state names of the first state machine. The at least one processor may be configured to execute the computer-readable instructions to cause the apparatus to perform the annotation by: creating a state machine represented as an adjacency list; inserting an automation state into the state machine; and deleting another automation state from the state machine.

In the apparatus as described in any of the preceding paragraphs, the at least one processor is configured to execute the computer-readable instructions to cause the apparatus to perform the identifying of the at least one possible error location by determining that a component with a wrong component type has been connected. The at least one processor may be configured to execute the computer-readable instructions to cause the apparatus to perform the annotation by replacing a D-type flip flop with a wire. The at least one processor may be configured to execute the computer-readable instructions to cause the apparatus to perform the localization by computing a smallest fragment of the circuit that, when modified, would cause the circuit to pass a functional test suite. The at least one processor may be configured to execute the computer-readable instructions to cause the apparatus to perform the localization using a model-based diagnosis (MBD) algorithm with an input including: a system description; a set of components; a set of observable variables; and an observation. A machine learning algorithm may be used instead of an MBD algorithm. The at least one processor may be configured to execute the computer-readable instructions to cause the apparatus to, as part of the localization, produce a diagnostic report that quantifies a number and a severity of errors of the circuit. In some embodiments, the at least one possible error locations comprises a plurality of possible error locations; and the at least one processor may be configured to execute the computer-readable instructions to cause the apparatus to perform the localization by: computing a posteriori probability of each error location of the plurality of error locations by applying Bayesian reasoning. In some embodiments, no table for storing a full joint probability distribution of the plurality of possible error locations is computed. The circuit may be a digital circuit. The at least one processor may be configured to execute the computer-readable instructions to cause the apparatus to perform the redesign by replacing an OR-gate with a XOR-gate. The at least one processor may be configured to execute the computer-readable instructions to cause the apparatus to perform the annotation by considering a switch that changes an order of connection of inputs to an adder of the circuit.

In another aspect, there is an apparatus for redesigning a circuit, comprising: at least one processor; and at least one memory including computer program code; the at least one memory and the computer program code may be configured to, with the at least one processor, cause the apparatus at least to: annotate the circuit by identifying at least one possible error location; localize the at least one possible error location; determine that for the localized at least one possible error location, no redesign pattern is available in a library; and in response to the determination that no redesign pattern is available: display, to a designer, a warning that a failure has occurred; and display, to the designer, a region of interest in the circuit where an error is most likely to reside based on the localized at least one possible error location.

In another aspect, there is a method for redesigning a circuit, comprising: annotating the circuit by identifying at least one possible error location; localizing the at least one possible error location; and redesigning the circuit based on the localized at least one possible error location.

In another aspect, there is a method to design a circuit, starting from only one circuit component, and adding additional components as per the design specification.

One aspect significantly decreases the cost of designing an integrated circuit.

Another aspect decreases the number of bugs in a digital design.

DETAILED DESCRIPTION

Figure 1:
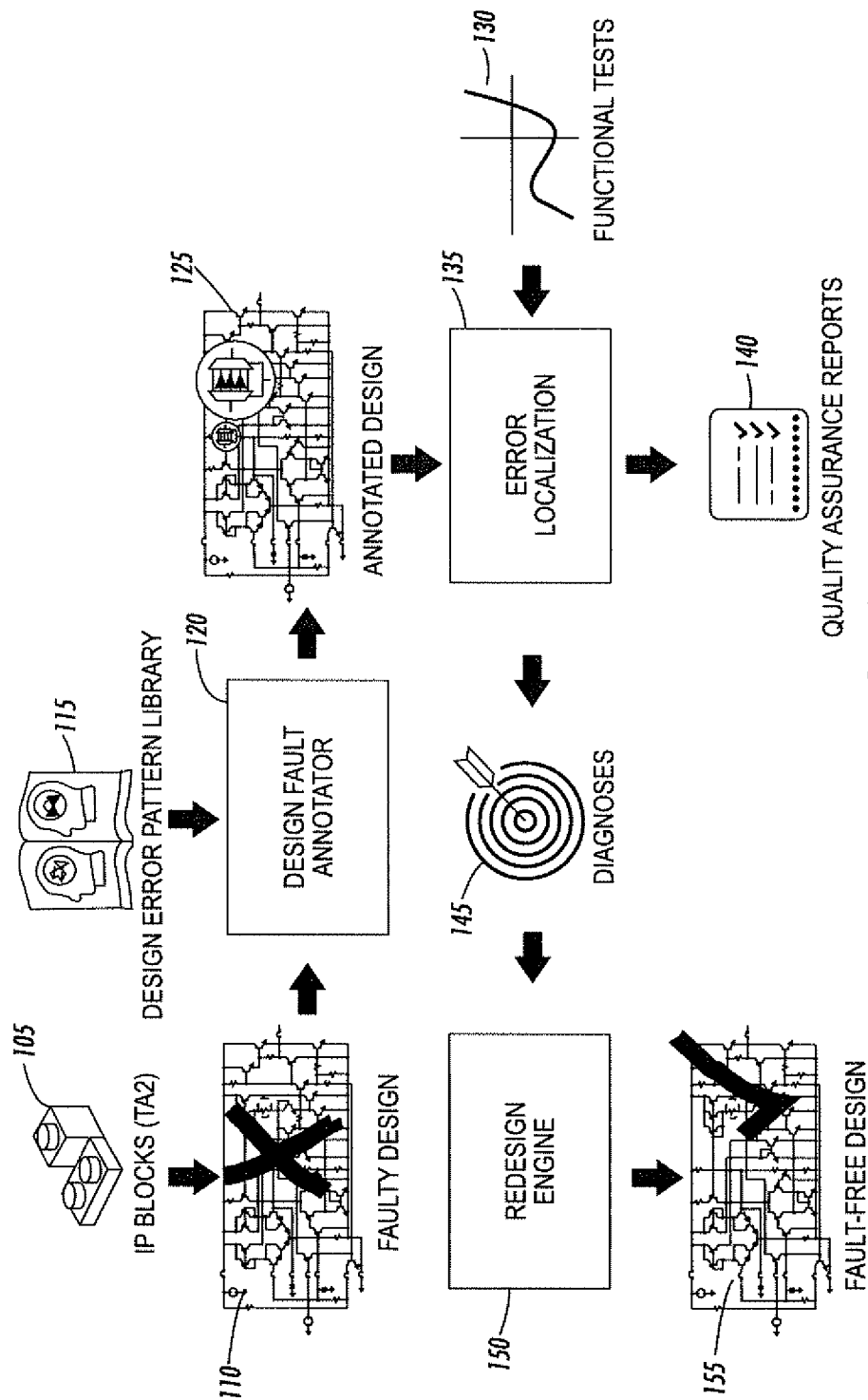
FIG. 1 illustrates an overview of a method described herein.

Some implementations described herein proceed in three phases: first, annotate the initial design with all possible design error locations; second, localize failures in the annotated design; and third, compute redesigns that remedy the design errors found without introducing new failures. The new automatic test and redesign concept is shown in FIG. 1. The first step is to use design fault annotator 120 to annotate the initial design (e.g., intellectual property [IP] Blocks 105 having a corresponding Technical Area [TA] of some other project participant, for example meaning the user, the customer, or the component library vendor) with possible design errors to show faulty design 110. This may be done using design error pattern library (or "error library") 115. The first step produces annotated design 125. If one considers a circuit design to be a simulation model, the process for annotating components with failure modes (in the described approach failure modes are design errors) automatically adds all possible and relevant "what-if-fail" equations. The failure modes reflect bugs and potential misconceptions in the designer's thinking, not electrical component failures. Very large circuits typically have multiple isomorphic subcircuits; therefore, algorithms must be developed for detecting them.

The second step is to take the annotated design 125 and, in combination with the functional tests 130, compute one or more diagnoses using error localization unit/block 135 (e.g. the diagnostic component). The diagnostic component computes one or more diagnostic candidates for the digital design. Although model-based diagnosis (MBD) was originally designed to find component failures in mechanical systems, the same approach can find design failures (a design failure is a deviation of a circuit from its design intent). The diagnostic component quantifies the number and the severity of the faults and summarizes them in a diagnostic report/quality assurance reports 140. The second step also produces diagnosis 145 to be used as input for the redesign engine 150 in the third step.

The third step is to close the design/test/redesign process using the redesign engine 150. The method computes a local modification to the design such that the new design/fault free design 155 does not violate the functional tests. This approach is analogous to physical fault identification, as identifying the correct fault also identifies the redesign. The redesigned circuit is then equivalent to the functional specification.

Annotating the Design, and Identifying Design Fault Types

The underlying vision of some approaches described herein is to automatically correct for the mistakes made by the designers. The disclosed approaches assume that sufficient information for rectifying the design is contained in the functional tests. In conventional circuit diagnosis, components can have fault modes such as stuck-at-1, stuck-at-2, capacitance shift, short, open, etc. The concept of fault mode is extremely useful in diagnosis because one can simulate the behavior of the circuit under different fault modes to confirm whether a fault mode is present or not. Debugging design faults is, in essence, no different than debugging physical faults. Thus, algorithmic machinery used for MBD of physical faults can be used to isolate design faults. Physical fault modes correspond to design mistakes and output stuck-at-1 is conceptually no different than an AND gate that should be a NAND gate.

A common mistake is connecting the wires of a component in the wrong order. Consider a 32-bit adder whose inputs are connected to a bus in the reverse order. This is a standard design error pattern in the fault or error library. The algorithm for annotating components with failure modes considers a switch that changes the order of connection depending on the presence of this failure. If the bus connection to one of the adder inputs is modeled by the propositional formula fragment $f \Rightarrow (b_{31} \Leftrightarrow i_0) \wedge (b_{30} \Leftrightarrow i_1) \wedge \ldots \wedge (b_0 \Leftrightarrow i_{31})$ where $b_0, b_1, \ldots, b_{31}$ are the bus wires and $i_0, i_1, \ldots, i_{31}$ are one of the two 32-bit adder input sets, the algorithm for annotating circuit components with failure modes introduces the fault variable f and changes the propositional formula fragment to:

$$f \Rightarrow (b_{31} \Leftrightarrow i_0) \wedge (b_{30} \Leftrightarrow i_1) \wedge \ldots \wedge (b_0 \Leftrightarrow i_{31})$$

$$\neg f \Rightarrow (b_0 \Leftrightarrow i_0) \wedge (b_1 \Leftrightarrow i_1) \wedge \ldots \wedge (b_{31} \Leftrightarrow i_{31})$$

Figure 2:
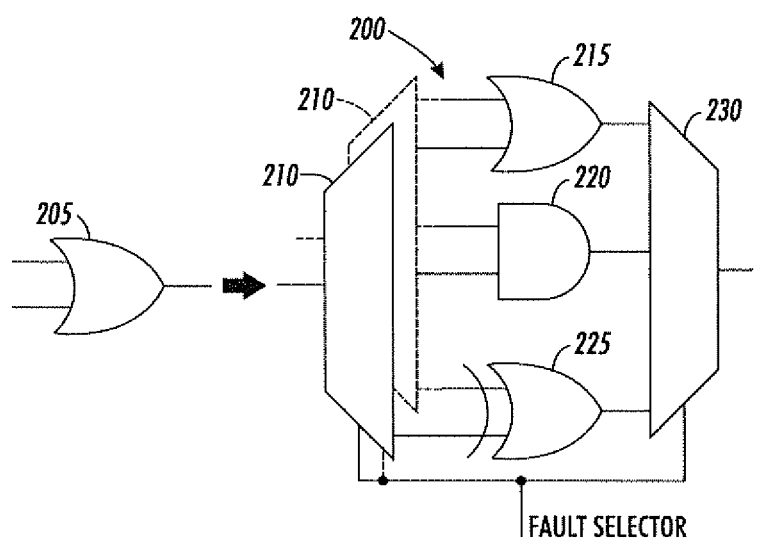
FIG. 2 shows an example of an annotation of components with possible failure modes.

A digital circuit containing the wrong component type is equivalent to specifying an incorrect connective in the logic representation of the circuit. The algorithm for annotating the circuit with failure modes replaces each component with a special logic block that contains a set of alternative components and multiplexers/demultiplexers (see, e.g., FIG. 2). The cell shown in FIG. 2 resembles a small Arithmetic-Logic Unit (ALU) or a logic cell 200 in a Field-Programmable Gate Array (FPGA). As a result, after annotating the initial logic design with possible failure modes, the process of diagnosing a wrongly-specified logic closely resembles the process of automatic VHDL logic synthesis. In the example of FIG. 2, a component 205 (in this example, an OR-gate) is replaced with logic cell 200 that includes alternative components including OR-gate 215, AND-gate 220, and XOR-gate 225. The example of FIG. 2 further shows demultiplexers 210, multiplexer 230 and a fault selector.

Figure 3:
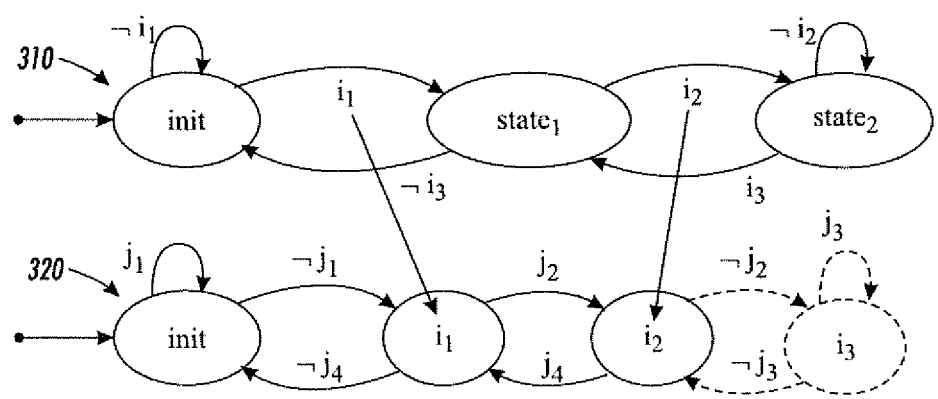
FIG. 3 shows an abstract example of two communicating finite state machines (FSMs) according to an embodiment.

Synchronization issues are important as they are particularly relevant in integrating multiple circuit designs from different vendors. Due to human communication mistakes, a state machine that communicates with another may miss states or have alternative states as shown in FIG. 3. Algorithms described herein for annotating components with failure modes provide an automatic approach to circuit abstraction.

Knowledge representation is important in some embodiments for the working of the failure mode annotation algorithm. Approaches described herein make use of Domain Specific Languages (DSLs) for representing circuits, state machines, etc. Consider the example shown in FIG. 3. The annotation algorithm inserts or deletes automaton states. It is relatively simple to do this if the automaton (e.g., the state machine or machines) is represented as an adjacency list. Constructing an adjacency list from the Abstract Syntax Tree (AST) of a suitable DSL (e.g., FSM-Language) is more convenient compared to working directly with the AST parsed from a Verilog or VHDL source. The design fault annotation algorithm can change the topology of a circuit if there are fan-in/fan-out components.

With further reference to FIG. 3, FIG. 3 illustrates an abstract example of two communicating FSMs 310, 320. The state names i1, i2, and i3 in the FSM 320 are used as inputs in FSM 310. The dashed vs solid lines signify intended vs achieved in the state machine.

In addition, to reduce the size of the search space, only valid "alternatives" are annotated per gate type. Therefore, if the component has two inputs and one output, it is not annotated with alternative component types having three inputs, two of which are short-circuited. The annotation is not restricted to specifying alternatives to combinational logic elements only. D-type flip-flops are annotated with failure modes by repeating them or by removing them all together and putting in a wire instead. This approach is equivalent to inserting/removing extra states in the state-machines implemented by the designer.

Automatic Localization of Design Faults

Similar to functional testing, MBD checks if a design passes all the specified tests. It also computes the location of the failure (in the original circuit design) as well as a corrective action. The redesign/test/analyze loop is shortened dramatically, the quality of the fix is improved, and the probability of a designer error being engraved in silicon is decreased. The algorithm for automatic localization of faults/errors computes the smallest Verilog (or VHDL or netlist) fragment or the smallest schematic part that, when modified, makes the functional test-suite pass. In the case of multiple design errors, it identifies a set of such smallest fragments. The algorithm is not diagnosing or testing components in the physical implementation of the device.

The class of MBD algorithms developed for the systems and methods described herein work on an input <SD, COMPS, OBS, α> where SD is the system description, COMPS is the set of components, OBS is the set of observable variables and α is the observation. Formally, each are described in either propositional logic or first order logic (FOL), The observation α can be directly generated from the functional tests as a propositional formula. It should be noted that the approaches described herein invert the application of observation compared to classical diagnostic reasoning. Classical diagnostics assumes that the model SD is correct and the observation is faulty. In the disclosed approach to functional testing, it is assumed that the model is faulty but the invariants or tests are correct. The disclosed approach using a bad model and nominal observation is novel.

Figure 4:
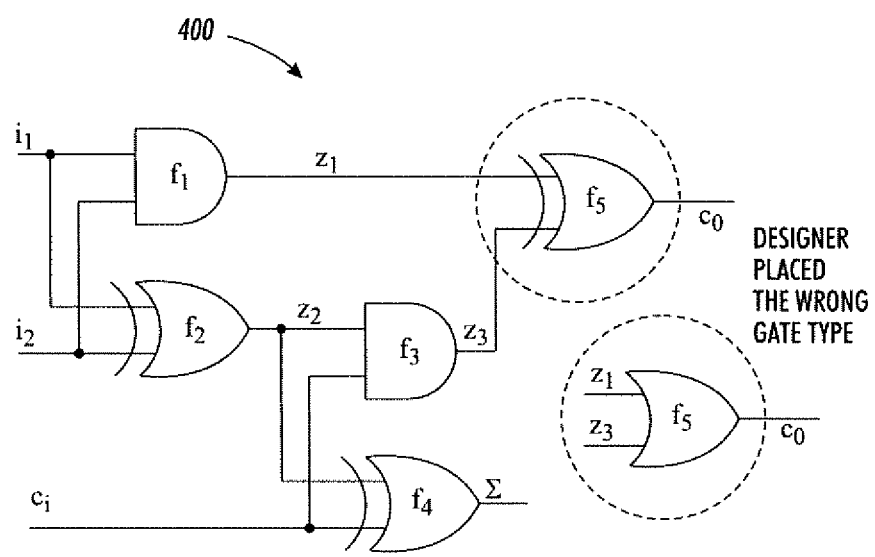
FIG. 4 illustrates an example of a bad 2-bit adder where the output OR-gate has been mistaken for an XOR-gate.

FIG. 4 shows an example of a bad 2-bit adder where the output OR-gate has been mistaken for an XOR-gate. FIG. 4 further illustrates an embodiment of a proposed approach to fault localization in the exercise of designing a full-adder 400. In this exercise, a tired undergraduate may make the logical mistake of using an XOR-gate instead of an OR-gate. The system description (SD) is the propositional logic formula equivalent to the circuit shown in FIG. 4 and the observation α is the test 0+0=0. The circuit shown in FIG. 4 is first annotated with failure modes as described above. Some embodiments of the diagnostic algorithm described herein infer, for each possible design fault, what the input-output variables to the component should have been, from which the algorithm can determine what the gate should have been. In the case of the example in FIG. 4, the "all nominal" simulation will turn out inconsistent. Switching the gate-type from XOR to OR yields a consistent simulation and makes the functional test pass. Hence, $f_5$ in the example of FIG. 4, is the Root Cause of Failure (RCoF).

It is possible to have more than one multiple-fault diagnosis consistent with an observation. In this case, the fault-diagnosis algorithm may compute all of them and compute the posteriori probability of each fault by applying Bayesian reasoning. In the case of circuit design (unlike diagnoses of physical failures) the faults are independent of each other and thus the diagnostic algorithm can maintain single probability for each fault variable. There is no need to compute and store possibly exponentially large table for the full joint probability distribution.

Adding time and state to the picture does not significantly increase the computational complexity. The Applicants have experimented with "unrolling" the digital circuit over a time-period of size T. The Applicants choose the parameter T such that the moving time-window encompasses one cycle in the periodic behavior of the system. We can determine an optimal value for T by starting from a reasonable value and doubling it (performing a binary search) until a cyclical pattern emerges.

It is often the case in MBD that, with insufficient amount of observation, the diagnosis is ambiguous. Diagnostic ambiguity means that there are multiple equally probable hypotheses consistent with the observations. One way to reduce the uncertainty is to extend the observation. How to extend the observation optimally, for example, which variable to measure next, is computed by the general diagnostic engine (GDE) algorithm. In addition to measuring new variables it is also possible to reduce the entropy by changing some user-configurable inputs. This is called active testing.

The systems and methods described herein propose to use the probing and active testing algorithms from MBD to guide the designer in creating functional tests. In this way, starting from a minimal functional test suite, the designers will extend the suite optimally to cover all functionality. It is expected that there will be a logarithmic reduction in the uncertainty of the functional test suite. This improvement comes from the operation of the probing and active testing algorithms: if, for example, a chain of components has a single failure, the probing algorithm splits the chain at each step and perform a binary search for the design error.

Automatic Logic Redesign

Some embodiments find a failing functional test and the location of the fault in the circuit, and then automatically suggest a fix in a format similar to spell-check. The key point is in understanding that the diagnosis computed in the previous section contains the corrective action for the circuit. Consider, for example, the case with the mistaken gate-type in the full-adder in FIG. 4. A diagnosis Ω specifies that a discrete parameter associated with gate $f_5$ should be 1 for an OR-gate instead of, say, 4 for an XOR-gate. Finalizing the redesign step removes the failure modes annotations and present the corrected circuit to the designer. The new circuit is guaranteed to pass all functional tests.

In some embodiments, there is fallback position if the design error pattern library is incomplete. When a design contains an unknown design error pattern, the algorithm reports a failure because it has no redesign pattern to restore the functional specification (e.g., it is assumed that the functional specification is complete here). The disclosed approaches do not fail silently; thus, the designers are not mislead to believe that they have a correct design. In one embodiment, a warning is sent to the designer that indicates that a failure has occurred. Moreover, the disclosed approaches repair all the errors that occur in its library to reduce the overall number of errors in the digital design. Fortunately, the approaches described herein will have localized the design errors to a small subset of the design, and can highlight to the designer the region of the design in which the error is most likely to reside. Some embodiments use this approach very successfully in software faults in which there are constantly new design error patterns. Still, it should be noted that not every detail of every component must be known for the algorithm to run successfully.

To further illustrate, the repair action is often contained in the diagnosis. For example, for a circuit and a specification and a diagnosis of "the digital circuit does not match the specification because gate 5 should be AND instead of OR". The repair action is to replace gate 5 from OR to AND.

Figure 5:
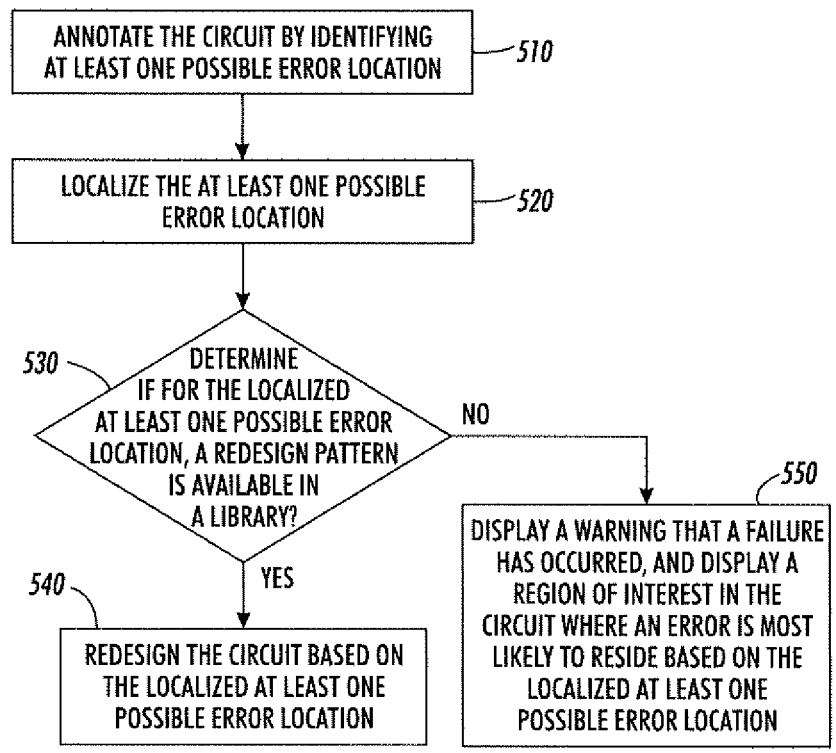
FIG. 5 illustrates an embodiment of a method described herein.

FIG. 5 illustrates an example related to embodiments described in the preceding paragraph. With reference to FIG. 5, in 510, a circuit is annotated by identifying at least one possible error location. In 520, the at least one possible error location is localized. In 520 it is determined if, for the localized at least one possible error location, a redesign pattern is available in a library. If so, in 540, the circuit is redesigned based on the localized at least one possible error location. If not, in 550, a warning that a failure has occurred is displayed, and a region of interest in the circuit is displayed where an error is most likely to reside based on the localized at least one possible error location.

In addition, it should be noted that the described process of automatic redesign can be applied to designs beyond digital circuits. For example, one can redesign mechanical systems, software, algorithms, buildings, laws, etc. Some embodiments also extend to analog circuits, and mixed digital-analog circuits.

It should also be noted that in some embodiments, the algorithm is continually run while a circuit is being designed. In some implementations, the algorithm is run when the designer commands that the algorithm be run.

In addition, efficiency can be further improved by using both multicore processing GPUs and Field-Programming Gate Arrays (FPGAs). To further explain the improvements in efficiency that may be achieved using parallelization, consider that GPUs and FPGAs are processing units that have thousands of cores. The gain in efficiency is reached by parallelizing the computations. This particularly useful in mini-batch cases, when some tasks can be parallelized and done on the GPU or on the FPGA. The management of the GPU operations is done automatically. Platforms such as CUDA are designed to allow the use of a GPU if present. If a GPU is not available, most CPU are multicore, and some gain can be achieved by making parallelizing the operations and running them on multiple cores simultaneously.

It should also be noted that the algorithm can be parallelized on a Field-Programmable Gate Array (FPGA). Alternatively, the algorithm can be parallelized on a cluster of servers.

It will be further appreciated that the techniques disclosed herein may be embodied by a non-transitory storage medium storing instructions readable and executable by an electronic data processing device to perform the disclosed techniques. Such a non-transitory storage medium may comprise a hard drive or other magnetic storage medium, an optical disk or other optical storage medium, a cloud-based storage medium such as a RAID disk array, flash memory or other non-volatile electronic storage medium, or so forth.

Of course, modifications and alterations will occur to others upon reading and understanding the preceding description. It is intended that the invention be construed as including all such modifications and alterations insofar as they come within the scope of the appended claims or the equivalents thereof.

The invention claimed is:

1. An apparatus for redesigning a circuit, comprising:
at least one processor; and
at least one memory including computer program code;
the at least one memory and the computer program code configured to, with the at least one processor, cause the apparatus at least to:
annotate an input circuit by identifying at least one possible design error location within the input circuit, where the at least one possible design error represents a deviation in the input circuit from what was intended to be a desired circuit;
localize the at least one possible design error location; and
redesign the circuit based on the localized at least one possible design error location.

2. The apparatus according to claim 1, wherein the at least one processor is configured to execute the computer-readable instructions to cause the apparatus to perform the identifying of the at least one possible design error location according to information from an error library.

3. The apparatus according to claim 1, wherein the at least one processor is configured to execute the computer-readable instructions to cause the apparatus to perform the identifying of the at least one possible design error location by determining that inputs to a component are connected to a bus in reverse order.

4. The apparatus according to claim 1, wherein the at least one processor is configured to execute the computer-readable instructions to cause the apparatus to perform the annotation by considering a switch that changes an order of connection of inputs to a component of the circuit.

5. The apparatus according to claim 1, wherein the at least one processor is configured to execute the computer-readable instructions to cause the apparatus to perform the annotation by using a logic block that replaces a first component, wherein the logic block includes:
alternative components,
a multiplexer, and
a demultiplexer.

6. The apparatus according to claim 5, wherein:
the first component is a nominal gate; and
the alternative components include gates of a different type than the nominal gate.

7. The apparatus according to claim 1, wherein the at least one processor is configured to execute the computer-readable instructions to cause the apparatus to perform the annotation according to:
a first state machine with state names of the first state machine; and
a second state machine, wherein inputs to the second state machine are the state names of the first state machine.

8. The apparatus according to claim 1, wherein the at least one processor is configured to execute the computer-readable instructions to cause the apparatus to perform the annotation by:
creating a state machine represented as an adjacency list;
inserting an automation state into the state machine; and
deleting another automation state from the state machine.

9. The apparatus according to claim 1, wherein the at least one processor is configured to execute the computer-readable instructions to cause the apparatus to perform the identifying of the at least one possible design error location by determining that a component with a wrong component type has been connected.

10. The apparatus according to claim 1, wherein the at least one processor is configured to execute the computer-readable instructions to cause the apparatus to perform the annotation by replacing a D-type flip flop with a wire.

11. The apparatus according to claim 1, wherein the at least one processor is configured to execute the computer-readable instructions to cause the apparatus to perform the localization by computing a smallest fragment of the circuit that, when modified, would cause the circuit to pass a functional test suite.

12. The apparatus according to claim 1, wherein the at least one processor is configured to execute the computer-readable instructions to cause the apparatus to perform the localization using a model-based diagnosis (MBD) algorithm with an input including:
a system description;
a set of components;
a set of observable variables; and
an observation.

13. The apparatus according to claim 1, wherein the at least one processor is configured to execute the computer-readable instructions to cause the apparatus to, as part of the localization, produce a diagnostic report that quantifies a number and a severity of design errors of the circuit.

14. The apparatus according to claim 1, wherein:
the at least one possible design error locations comprises a plurality of possible design error locations; and
the at least one processor is configured to execute the computer-readable instructions to cause the apparatus to perform the localization by:
computing a posteriori probability of each design error location of the plurality of design error locations by applying Bayesian reasoning.

15. The apparatus according to claim 14, wherein no table for storing a full joint probability distribution of the plurality of possible design error locations is computed.

16. The apparatus of claim 1, wherein the circuit is a digital circuit.

17. The apparatus according to claim 1, wherein the at least one processor is configured to execute the computer-readable instructions to cause the apparatus to perform the redesign by replacing an OR-gate with a XOR-gate.

18. The apparatus according to claim 1, wherein the at least one processor is configured to execute the computer-readable instructions to cause the apparatus to perform the annotation by considering a switch that changes an order of connection of inputs to an adder of the circuit.

19. An apparatus for redesigning a circuit, comprising:
at least one processor; and
at least one memory including computer program code;
the at least one memory and the computer program code configured to, with the at least one processor, cause the apparatus at least to:
annotate an input circuit by identifying at least one possible design error location within the input circuit, where the at least one possible design error represents a deviation in the input circuit from what was intended to be a desired circuit;
localize the at least one possible design error location;
determine that for the localized at least one possible design error location, no redesign pattern is available in a library; and
in response to the determination that no redesign pattern is available:
display, to a designer, a warning that a failure has occurred; and
display, to the designer, a region of interest in the input circuit where a design error is most likely to reside based on the localized at least one possible design error location.

20. A method for redesigning a circuit, comprising:
annotating an input circuit by identifying at least one possible design error location within the input circuit, where the at least one possible design error represents a deviation in the input circuit from what was intended to be a desired circuit;
localizing the at least one possible design error location; and
redesigning the circuit based on the localized at least one possible design error location.

* * * * *